United States Patent
Hayes et al.

(10) Patent No.: US 11,897,512 B2
(45) Date of Patent: Feb. 13, 2024

(54) MODIFYING SETTINGS OF AUTONOMOUS VEHICLE SENSORS BASED ON PREDICTED ENVIRONMENTAL STATES

(71) Applicant: GHOST AUTONOMY INC., Mountain View, CA (US)

(72) Inventors: John Hayes, Mountain View, CA (US); Volkmar Uhlig, Cupertino, CA (US); Nima Soltani, Los Gatos, CA (US)

(73) Assignee: GHOST AUTONOMY INC., Mountain View, CA (US)

(*) Notice: Subject to any disclaimer, the term of this patent is extended or adjusted under 35 U.S.C. 154(b) by 589 days.

(21) Appl. No.: 16/906,305

(22) Filed: Jun. 19, 2020

(65) Prior Publication Data

US 2021/0394795 A1 Dec. 23, 2021

(51) Int. Cl.
*B60W 60/00* (2020.01)
*B60W 50/06* (2006.01)
*G06N 5/04* (2023.01)

(52) U.S. Cl.
CPC ........ *B60W 60/0025* (2020.02); *B60W 50/06* (2013.01); *G06N 5/04* (2013.01); *B60W 2420/42* (2013.01)

(58) Field of Classification Search
CPC ............. B60W 60/0025; B60W 50/06; B60W 2420/42; G06N 5/04
See application file for complete search history.

(56) References Cited

U.S. PATENT DOCUMENTS

| | | | | |
|---|---|---|---|---|
| 10,097,746 B2* | 10/2018 | Lasher | ............... | H04N 21/2183 |
| 10,379,535 B2* | 8/2019 | Migneco | ................ | A61B 5/746 |
| 11,468,285 B1* | 10/2022 | Tang | ...................... | H04N 5/144 |
| 2006/0208169 A1* | 9/2006 | Breed | ..................... | G01S 7/417 250/221 |
| 2015/0253772 A1* | 9/2015 | Solyom | ............... | B60W 50/082 701/25 |
| 2018/0205944 A1* | 6/2018 | Seo | ..................... | H04N 13/0484 |
| 2019/0180118 A1* | 6/2019 | Kraeling | ................... | G01P 3/38 |
| 2019/0180502 A1* | 6/2019 | Englard | .................. | G06T 17/20 |
| 2020/0164814 A1* | 5/2020 | Solar | ...................... | H04N 7/183 |
| 2020/0356835 A1* | 11/2020 | Robinson | ............... | B60W 40/09 |

OTHER PUBLICATIONS

R. O'Malley; M. Glavin; E. Jones, "Vision-based detection and tracking of vehicles to the rear with perspective correction in low-light conditions", 2010, IET Intelligent Transport Systems vol. 5, Issue 1 (Year: 2010).*

* cited by examiner

*Primary Examiner* — Russell Frejd
*Assistant Examiner* — Brittany Renee Peko

(57) ABSTRACT

Modifying settings of autonomous vehicle sensors based on predicted environmental states, including: determining, based on sensor data, that a predicted environmental state of the autonomous vehicle is associated with a sensory input outside an operating range of a sensor; determining a modified operating range of the sensor; and modifying one or more sensors to operate according to the modified operating range.

20 Claims, 10 Drawing Sheets

MODIFYING SETTINGS OF AUTONOMOUS VEHICLE SENSORS BASED ON PREDICTED ENVIRONMENTAL STATES

BACKGROUND

Field of the Invention

The field of the invention is data processing, or, more specifically, methods, apparatus, autonomous vehicles, and products for modifying settings of autonomous vehicle sensors based on predicted environmental states.

Description of Related Art

Sensors used in an autonomous vehicle may be configured to accept sensory inputs within a particular operational range. The operational range of a sensor may be based on one or more configurable attributes or settings. For example, camera sensors may be configured to accept light of a particular brightness based on an exposure setting. Where the sensory inputs captured by a sensor are outside of the operational range, the resulting sensor data may be unusable or less effective in generating predictive driving decisions.

SUMMARY

Modifying settings of autonomous vehicle sensors based on predicted environmental states, including: determining, based on sensor data, that a predicted environmental state of the autonomous vehicle is associated with a sensory input outside an operating range of a sensor; determining a modified operating range of the sensor; and modifying one or more sensors to operate according to the modified operating range.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
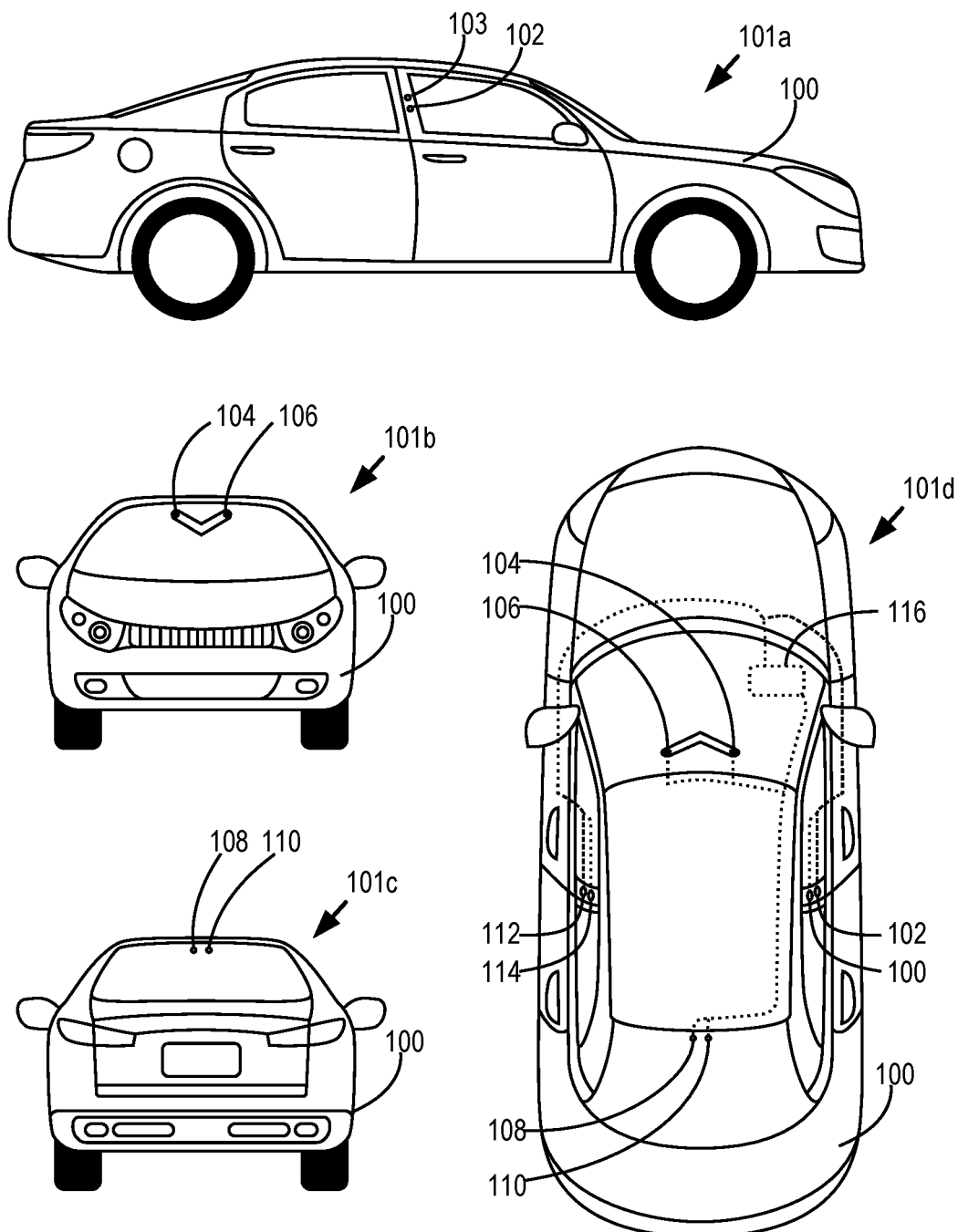
FIG. 1 shows example views of an autonomous vehicle for modifying settings of autonomous vehicle sensors based on predicted environmental states.

Modifying settings of autonomous vehicle sensors based on predicted environmental states may be implemented in an autonomous vehicle. Accordingly, FIG. 1 shows multiple views of an autonomous vehicle 100 configured for modifying settings of autonomous vehicle sensors based on predicted environmental states according to embodiments of the present invention. Right side view 101a shows a right side of the autonomous vehicle 100. Shown in the right side view 101a are cameras 102 and 103, configured to capture image data, video data, and/or audio data of the environmental state of the autonomous vehicle 100 from the perspective of the right side of the car. Front view 101b shows a front side of the autonomous vehicle 100. Shown in the front view 101b are cameras 104 and 106, configured to capture image data, video data, and/or audio data of the environmental state of the autonomous vehicle 100 from the perspective of the front of the car. Rear view 101c shows a rear side of the autonomous vehicle 100. Shown in the rear view 101c are cameras 108 and 110, configured to capture image data, video data, and/or audio data of the environmental state of the autonomous vehicle 100 from the perspective of the rear of the car. Top view 101d shows a rear side of the autonomous vehicle 100. Shown in the top view 101d are cameras 102-110. Also shown are cameras 112 and 114, configured to capture image data, video data, and/or audio data of the environmental state of the autonomous vehicle 100 from the perspective of the left side of the car.

Further shown in the top view 101d is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine a operational state and/or operational history of the autonomous vehicle. The automation computing system 116 may then determine one or more operational commands for the autonomous vehicle (e.g., a change in speed or acceleration, a change in brake application, a change in gear, a change in turning or orientation, etc.). The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 if FIG. 1 is shown as car, it is understood that autonomous vehicles 100 configured for modifying settings of autonomous vehicle sensors based on predicted environmental states may also include other vehicles, including motorcycles, planes, helicopters, unmanned aerial vehicles (UAVs, e.g., drones), or other vehicles as can be appreciated. Moreover, it is understood that additional cameras or other external sensors may also be included in the autonomous vehicle 100.

Modifying settings of autonomous vehicle sensors based on predicted environmental states in accordance with the present invention is generally implemented with computers, that is, with automated computing machinery. For further explanation, therefore, FIG. 2 sets forth a block diagram of automated computing machinery comprising an exemplary automation computing system 116 configured for modifying settings of autonomous vehicle sensors based on predicted environmental states according to embodiments of the present invention. The automation computing system 116 of FIG. 2 includes at least one computer Central Processing Unit (CPU) package 204 as well as random access memory 206 ('RAM') which is connected through a high speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, Lidar sensors, or other sensors as can be appreciated. As described herein, cameras may include a stolid state sensor 212 with a solid state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 212 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs), etc.). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 214.

Stored in RAM 206 is an automation module 220. The automation module 220 may be configured to process sensor data from the sensors 212 to determine a driving decision for the autonomous vehicle. The driving decision comprises one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other command as can be appreciated. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222.

In some embodiments, the automation module 220 may be configured to determine an exit path for an autonomous vehicle 100 in motion. The exit path includes one or more operational commands that, if executed, are determined and/or predicted to bring the autonomous vehicle 100 safely to a stop (e.g., without collision with an object, without violating one or more safety rules). The automation module 220 may determine a both a driving decision and an exit path at a predefined interval. The automation module 220 may then send the driving decision and the exit path to the autonomous vehicle control systems 223. The autonomous vehicle control systems 223 may be configured to execute the driving decision unless an error state has been reached. If an error decision has been reached, therefore indicating a possible error in functionality of the automation computing system 116), the autonomous vehicle control systems 223 may then execute a last received exit path in order to bring the autonomous vehicle 100 safely to a stop. Thus, the autonomous vehicle control systems 223 are configured to receive both a driving decision and exit path at predefined intervals, and execute the exit path in response to an error.

The autonomous vehicle control systems 223 are configured to affect the movement and operation of the autonomous vehicle 100. For example, the autonomous vehicle control systems 223 may activate (e.g., apply one or more control signals) to actuators or other components to turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor data 212 (e.g., sensor data 212 having object recognition, compression, depth filtering, or other processes applied). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 224) prior to upload to a execution environment 227. Such operations can include filtering, compression, encoding, decoding, or other operations as can be appreciated. The data processing module 226 may then communicate the processed and stored sensor data to the execution environment 227.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation module 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's i OS™, and others as will occur to those of skill in the art. For example, the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Readers will appreciate that although the example included in the preceding paragraph relates to an embodiment where the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. For example, as the automation module 220 must make determinations as to operational commands to facilitate autonomous operation of a vehicle. Accordingly, the automation module 220 must make such determinations within one or more time constraints in order for autonomous operation to be performed in real time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constrains, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
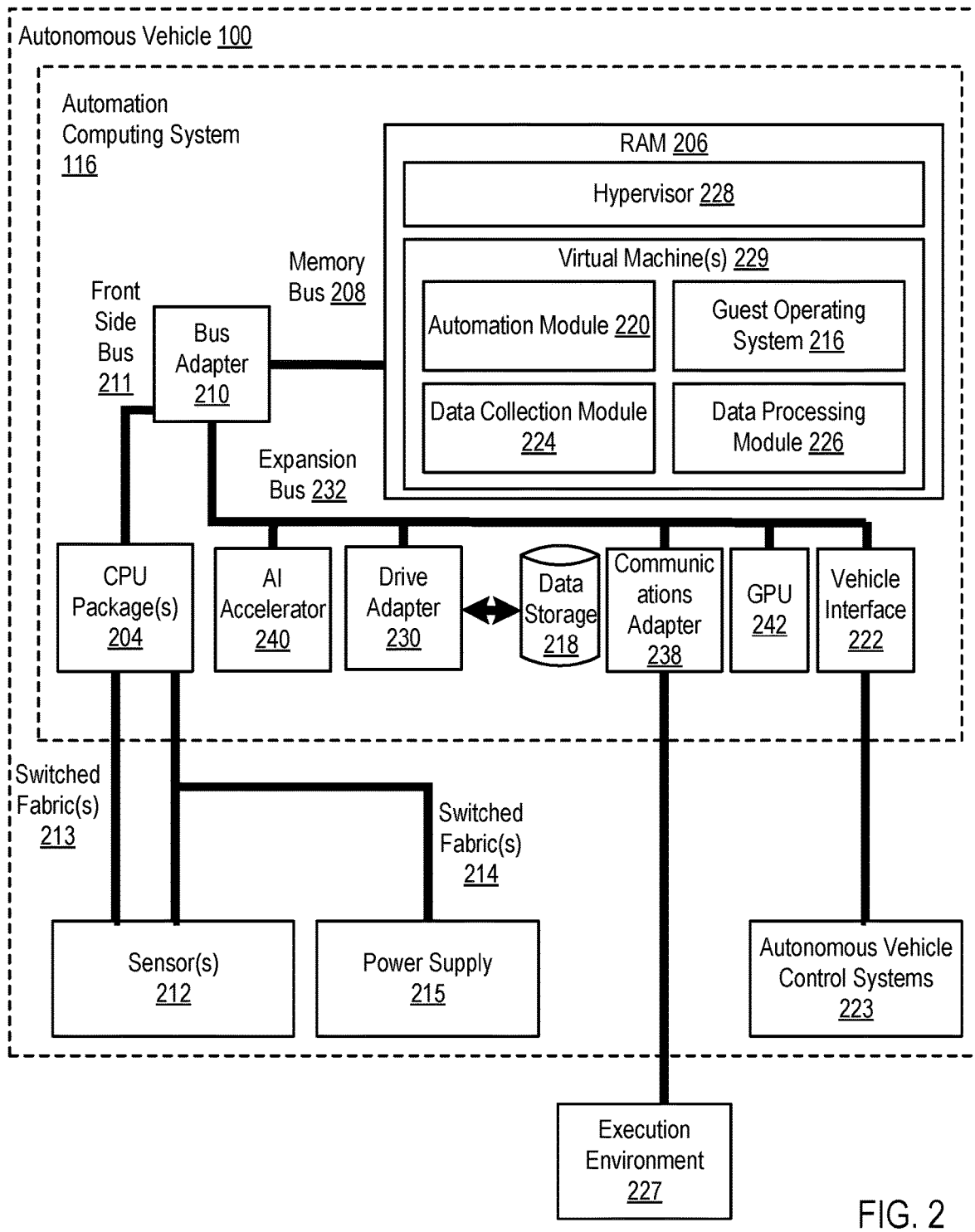
FIG. 2 is block diagram of an autonomous computing system for modifying settings of autonomous vehicle sensors based on predicted environmental states.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to processor(s) 204 and other components of the automation computing system 116. Disk drive adapter 230 connects non-volatile data storage to the automation computing system 116 in the form of data storage 213. Disk drive adapters 230 useful in computers configured for modifying settings of autonomous vehicle sensors based on predicted environmental states according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for modifying settings of autonomous vehicle sensors based on predicted environmental states according to embodiments of the present invention include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
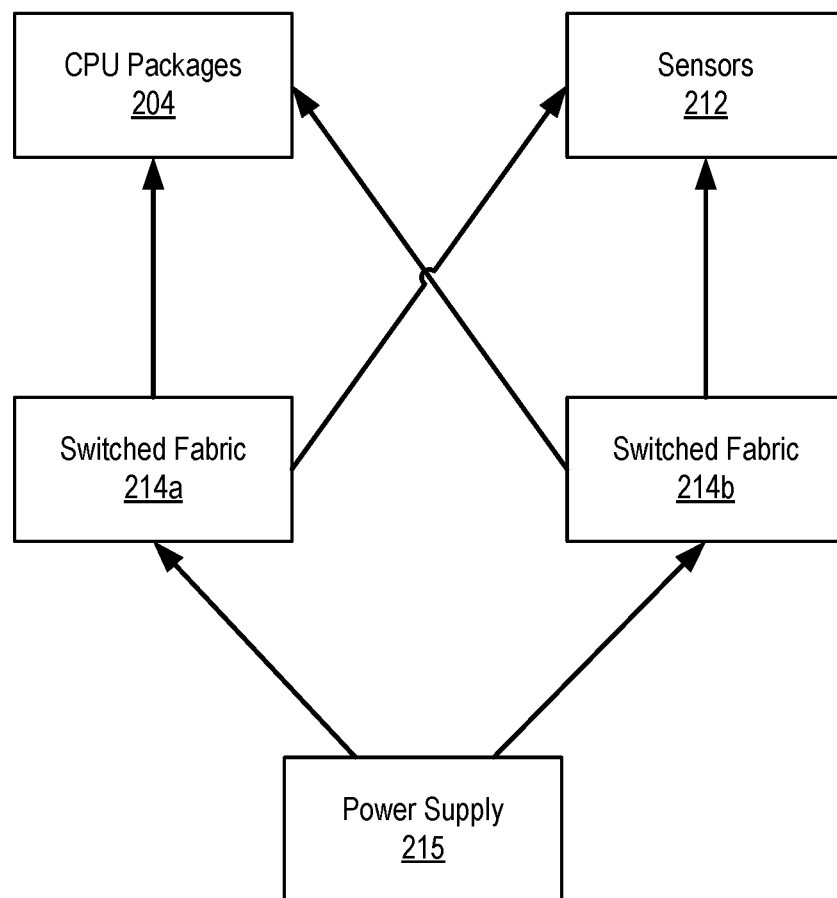
FIG. 3 is a block diagram of a redundant power fabric for modifying settings of autonomous vehicle sensors based on predicted environmental states.

FIG. 3 shows an example redundant power fabric for modifying settings of autonomous vehicle sensors based on predicted environmental states. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, it is understood that the approach shown by FIG. 3 can be modified to include additional switched fabrics 214.

Figure 4:
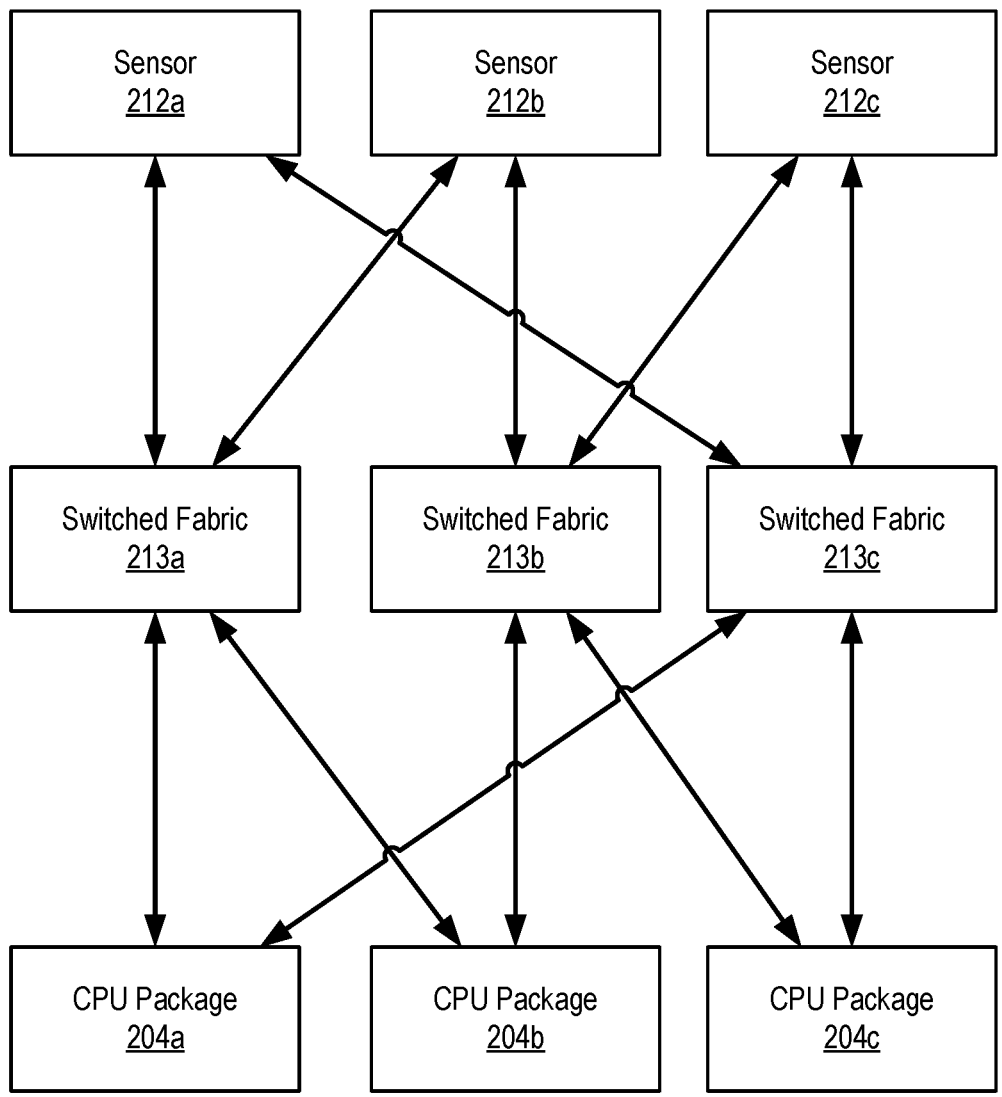
FIG. 4 is a block diagram of a redundant data fabric for modifying settings of autonomous vehicle sensors based on predicted environmental states.

FIG. 4 is an example redundant data fabric for modifying settings of autonomous vehicle sensors based on predicted environmental states. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy as can be appreciated by one skilled in the art.

Figure 5:
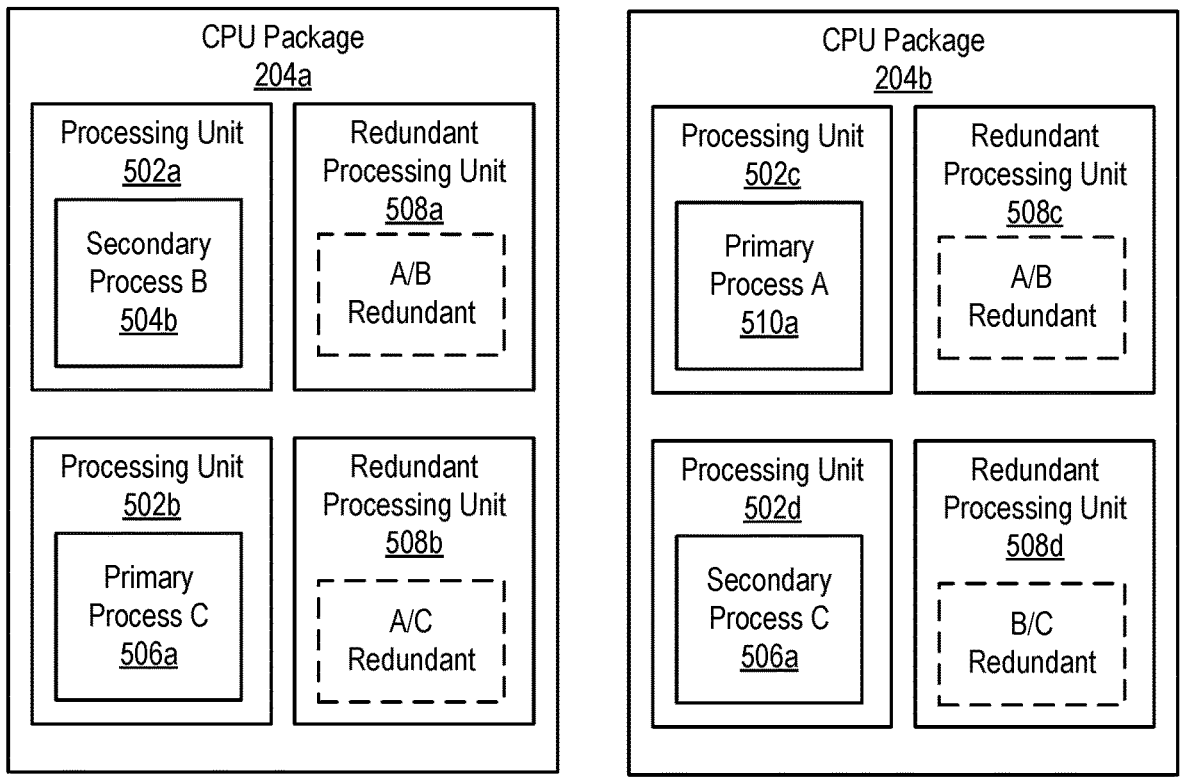
FIG. 5 is an example view of process allocation across CPU packages for modifying settings of autonomous vehicle sensors based on predicted environmental states.
Figure 5:
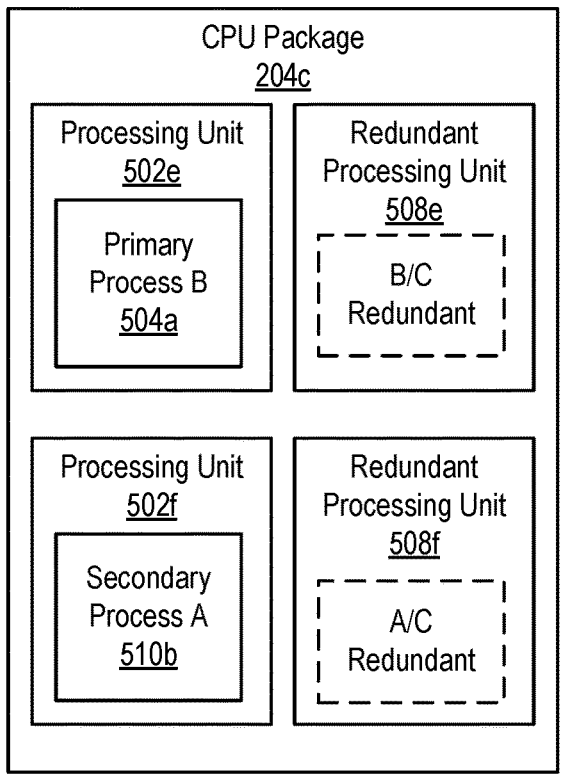

FIG. 5 is an example view of process allocation across CPU packages for modifying settings of autonomous vehicle sensors based on predicted environmental states. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504b, while processing unit 502b has been allocated primary execution of "process C," denoted as primary process C 506a.

CPU package 204a also comprises two redundant processing units that are not actively executing a process A, B, or C, but are instead reserved in case of failure of an active processing unit. Redundant processing unit 508a has been reserved as "AB redundant," indicating that reserved processing unit 508a may be allocated primary or secondary execution of processes A or B in the event of a failure of a processing unit allocated the primary or secondary execution of these processes. Redundant processing unit 508b has been reserved as "A/C redundant," indicating that reserved processing unit 508b may be allocated primary or secondary execution of processes A or C in the event of a failure of a processing unit allocated the primary or secondary execution of these processes.

CPU package 204b includes processing unit 502c, which has been allocated primary execution of "process A," denoted as primary process A 510a, and processing unit 502d, which has been allocated secondary execution of "process C," denoted as secondary process C 506a. CPU package 204b also includes redundant processing unit 508c, reserved as "AB redundant," and redundant processing unit 508d, reserved as "B/C redundant." CPU package 204c includes processing unit 502e, which has been allocated primary execution of "process B," denoted as primary process B 504a, and processing unit 502f, which has been allocated secondary execution of "process A," denoted as secondary process A 510b. CPU package 204c also includes redundant processing unit 508e, reserved as "B/C redundant," and redundant processing unit 508f, reserved as "A/C redundant."

As set forth in the example view of FIG. 5, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508a-f allow for allocation of primary or secondary execution of a process in the event of processing unit failure. This further prevents errors caused by processing unit failure as parallel primary and secondary execution of a process may be restored. One skilled in the art would understand that the number of CPU packages, processing units, redundant processing units, and processes may be modified according to performance requirements while maintaining redundancy.

Figure 6:
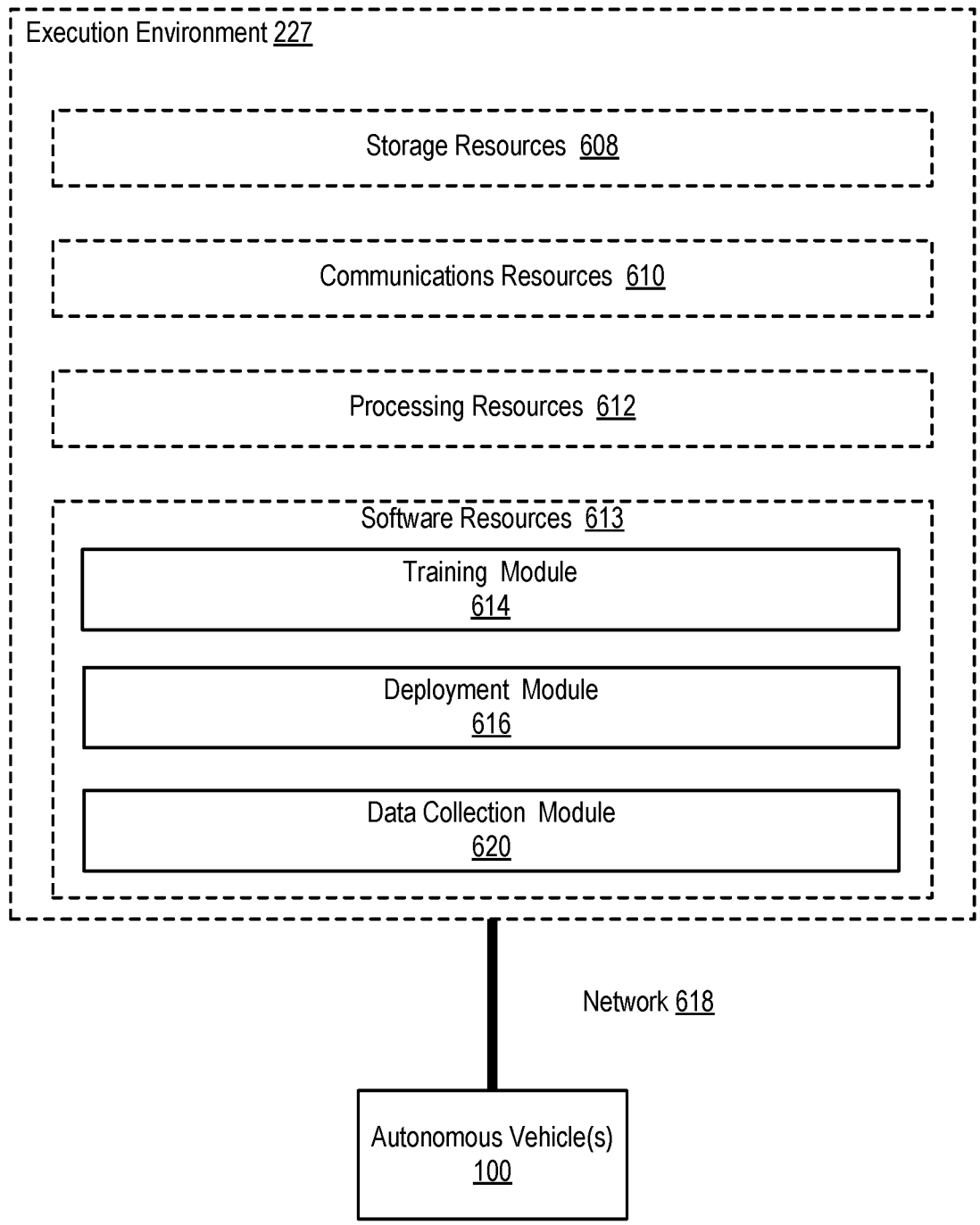
FIG. 6 is an example view of an execution environment for modifying settings of autonomous vehicle sensors based on predicted environmental states.

For further explanation, FIG. 6 sets forth a diagram of an execution environment 227 in accordance with some embodiments of the present disclosure. The execution environment 227 depicted in FIG. 6 may be embodied in a variety of different ways. The execution environment 227 may be provided, for example, by one or more cloud computing providers such as Amazon AWS, Microsoft Azure, Google Cloud, and others, including combinations thereof. Alternatively, the execution environment 227 may be embodied as a collection of devices (e.g., servers, storage devices, networking devices) and software resources that are included in a private data center. In fact, the execution environment 227 may be embodied as a combination of cloud resources and private resources that collectively form a hybrid cloud computing environment. Readers will appreciate that the execution environment 227 may be constructed in a variety of other ways and may even include resources within one or more autonomous vehicles or resources that communicate with one or more autonomous vehicles.

The execution environment 227 depicted in FIG. 6 may include storage resources 608, which may be embodied in many forms. For example, the storage resources 608 may include flash memory, hard disk drives, nano-RAM, 3D crosspoint non-volatile memory, MRAM, non-volatile phase-change memory ('PCM'), storage class memory ('SCM'), or many others, including combinations of the storage technologies described above. Readers will appreciate that other forms of computer memories and storage devices may be utilized as part of the execution environment 227, including DRAM, SRAM, EEPROM, universal memory, and many others. The storage resources 608 may also be embodied, in embodiments where the execution environment 227 includes resources offered by a cloud provider, as cloud storage resources such as Amazon Elastic Block Storage ('EBS') block storage, Amazon S3 object storage, Amazon Elastic File System ('EFS') file storage, Azure Blob Storage, and many others. The example execution environment 227 depicted in FIG. 6 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 227 depicted in FIG. 6 also includes communications resources 610 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 610 may be configured to utilize a variety of different protocols and data communication fabrics to facilitate data communications. For example, the communications resources 610 may utilize Internet Protocol ('IP') based technologies, fibre channel ('FC') technologies, FC over ethernet ('FCoE') technologies, InfiniBand ('IB') technologies, NVM Express ('NVMe') technologies and NVMe over fabrics ('NVMeoF') technologies, and many others. The communications resources 610 may also be embodied, in embodiments where the execution environment 227 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle).

The execution environment 227 depicted in FIG. 6 also includes processing resources 612 that may be useful in useful in executing computer program instructions and performing other computational tasks within the execution environment 227. The processing resources 612 may include one or more application-specific integrated circuits ('ASICs') that are customized for some particular purpose, one or more central processing units ('CPUs'), one or more digital signal processors ('DSPs'), one or more field-programmable gate arrays ('FPGAs'), one or more systems on a chip ('SoCs'), or other form of processing resources 612. The processing resources 612 may also be embodied, in embodiments where the execution environment 227 includes resources offered by a cloud provider, as cloud computing resources such as one or more Amazon Elastic Compute Cloud ('EC2') instances, event-driven compute resources such as AWS Lambdas, Azure Virtual Machines, or many others.

The execution environment 227 depicted in FIG. 6 also includes software resources 613 that, when executed by processing resources 612 within the execution environment 227, may perform various tasks. The software resources 613 may include, for example, one or more modules of computer program instructions that when executed by processing resources 612 within the execution environment 227 are useful in training neural networks configured to determine control autonomous vehicle control operations. For example, a training module 614 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 614 may provide a corpus of training data, or a selected subset of training data, to train the neural network. For example, the training module 614 may select particular subsets of training data associated with particular driving conditions, environment states, etc. to train the neural network.

The software resources 613 may include, for example, one or more modules of computer program instructions that when executed by processing resources 612 within the execution environment 227 are useful in deploying software resources or other data to autonomous vehicles 100 via a network 618. For example, a deployment module 616 may provide software updates, neural network updates, or other data to autonomous vehicles 100 to facilitate autonomous vehicle control operations.

The software resources 613 may include, for example, one or more modules of computer program instructions that when executed by processing resources 612 within the execution environment 227 are useful in collecting data from autonomous vehicles 100 via a network 618. For example, a data collection module 620 may receive, from autonomous vehicles 100, collected sensor 212, associated control operations, software performance logs, or other data.

Such data may facilitate training of neural networks via the training module 614 or stored using storage resources 608.

Figure 7:
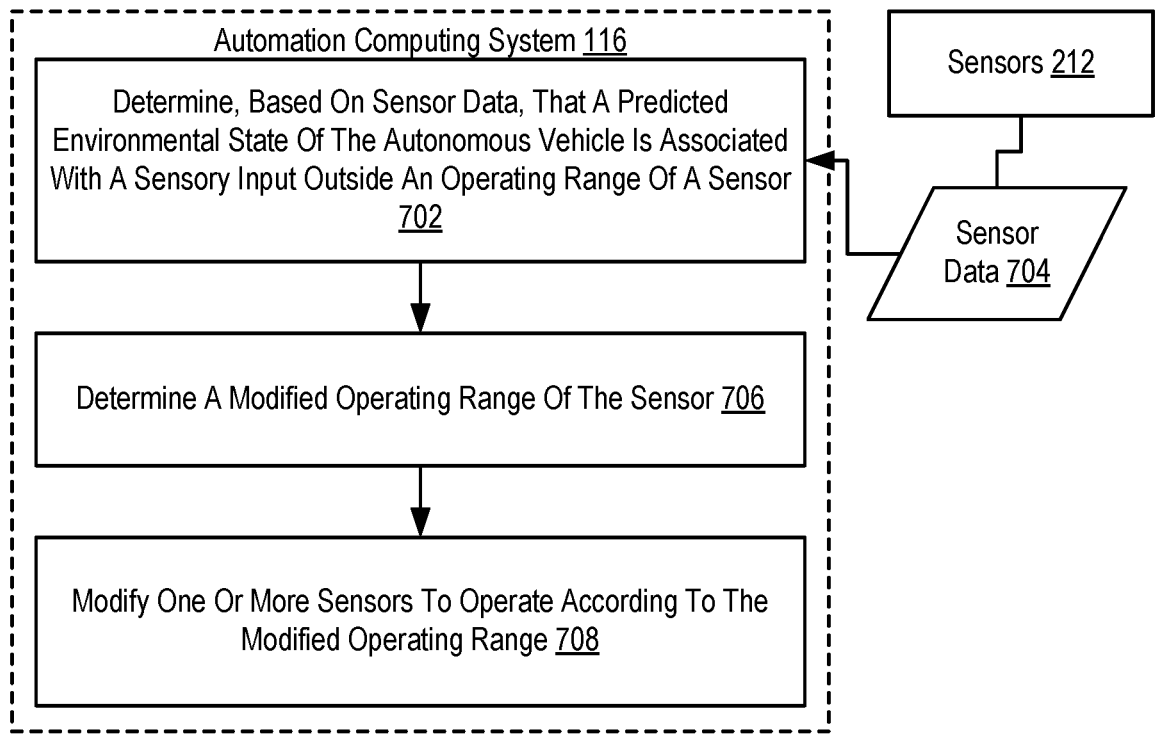
FIG. 7 is a flowchart of an example method for modifying settings of autonomous vehicle sensors based on predicted environmental states.

For further explanation, FIG. 7 sets forth a flow chart illustrating an exemplary method for modifying settings of autonomous vehicle sensors based on predicted environmental states that includes determining 702 (e.g., by an automation computing system 116), based on sensor data 704 (e.g., from one or more sensors 212), that a predicted environmental state of the autonomous vehicle 100 is associated with a sensory input outside an operating range of a sensor 212. An operating range of a sensor 212 is a range of sensory inputs for the particular sensor that results in usable sensor data 212. For example, the operating range of a camera sensor 212 may include a range of brightness or illumination that, given a particular exposure setting of the camera sensor 212, will result in usable image or video data (e.g., not over- or under-exposed). In this example, image or video data may be considered usable when the illumination of the photo or video data falls within a particular range, when image objects can be detected and/or identified, when image objects are in focus (e.g., not blurred), etc.

Determining 702, based on the sensor data 704, that the predicted environmental state of the autonomous vehicle 100 is associated with a sensory input outside the operating range of the sensor 212 may include identifying one or more boundaries or transitions in the sensor data 212 that the autonomous vehicle 100 is predicted to pass through (e.g., based on current or predicted speeds and trajectories of the autonomous vehicle). The one or more boundaries may include a light-to-shadow boundary, where a portion of the environment transitions between a shadowed area and a lit area (e.g., transitioning from shadow to light, or transitioning from light to shadow). Accordingly, after identifying the light-to-shadow boundary, it may be determined that the autonomous vehicle 100 will at least partially cross the light-to-shadow boundary (e.g., at least the sensor 212 will cross the light-to-shadow boundary). In this example, a camera sensor 212 with an exposure setting configured for a shadowed environment would, after entering a directly lit area, capture over exposed image or video data. Thus, the transition from a shadowed area to a directly lit area would result in a sensory input (e.g., light) that is outside the operating range of the camera sensor 212.

The prediction of whether the predicted environmental state of the autonomous vehicle 100 is associated with a sensory input outside the operating range of the sensor 212 may be based on one or more algorithms. For example, the prediction may be based on a hand-tuned algorithm and/or one or more machine learning models. The machine learning models may accept, as input, sensor data 704, current or predicted speeds, trajectories, etc. of the autonomous vehicle 100, etc. The machine learning models may provide, as output, a predicted location of the autonomous vehicle 100 (e.g., the predicted environmental state) and/or an indication of whether or not the predicted environmental state will include the sensory input outside the operating range of the sensor 212.

The method of FIG. 7 also includes determining 706 (e.g., by the automation computing system 116) a modified operating range of the sensor 212. Determining 706 the modified operating range of the sensor 212 may include determining, based on the predicted environmental state, a particular operating range and/or sensor 212 settings to achieve the particular operating range. For example, where the predicted environmental state is associated with passing a light-to-shadow boundary, determining 706 the modified operating range of the sensor 212 may include determining an exposure setting or other setting for the lighting of the predicted environmental state (e.g., a setting for lit or shadowed environments, depending on the predicted environmental state). The modified operating range of the sensor 212 may be determined from a predefined selection of sensor 212 setting associated with particular environmental states. The modified operating range of the sensor 212 may also be determined by dynamically calculating a particular setting to achieve the modified operating range of the sensor 212.

The method of FIG. 7 also includes modifying 708 (e.g., by the automation computing system 116) one or more sensors 212 to operate according to the modified operating range. Modifying 708 the one or more sensors 212 to operate according the modified operating range may include modifying one or more configurable attributes or settings of the one or more sensors 212 to achieve the modified operating range. Modifying 708 the one or more sensors 212 may include modifying the sensor 212 predicted to receive the sensory input outside of its operating range. Modifying 708 the one or more sensors 212 may include modifying 212 a plurality of sensors associated with a same sensing space (e.g., facing a same or similar direction relative to the autonomous vehicle 100). Modifying 708 the one or more sensors 212 may also include modifying a sensor 212 not providing actively processed sensor data 704 to the automation computing system 116 (e.g., a redundant sensor 212). For example, assume that it was determined that the predicted environmental state of the autonomous vehicle 100 is associated with a sensory input outside of the operating range of a first sensor 212. Further assume that the automation computing system 116 is processing sensor data 704 from this first sensor 212 to generate driving decisions. A second sensor 212 (e.g., a redundant sensor 212) in the same sensing space as the first sensor 212 may be modified to operate according to the modified operating range. A switched fabric coupling the automation computing system 116 to sensors 212 may be modified to receive sensor data 704 from the second sensor 212 instead of the first sensor 212.

Figure 8:
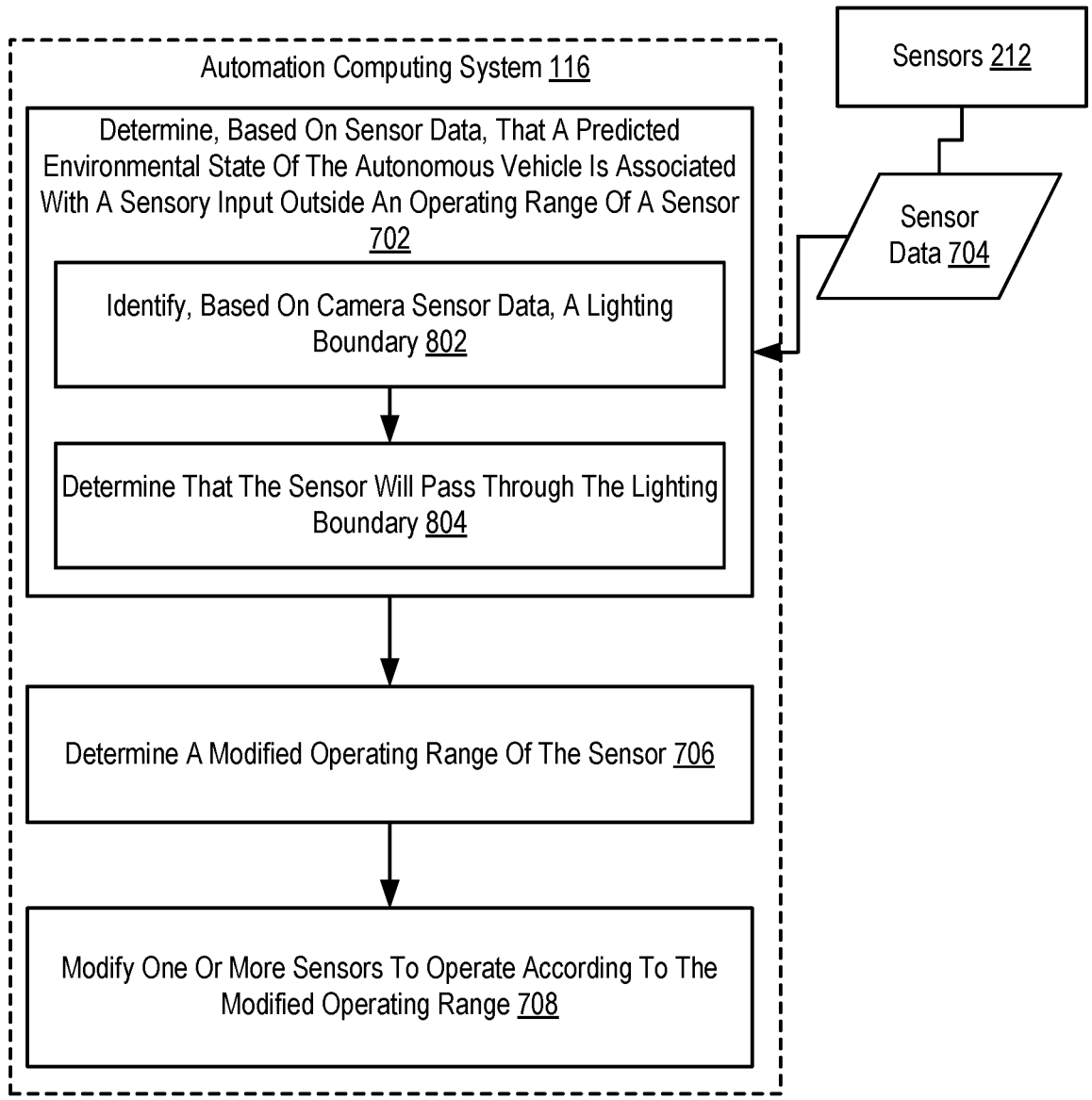
FIG. 8 is a flowchart of an example method for modifying settings of autonomous vehicle sensors based on predicted environmental states.

For further explanation, FIG. 8 sets forth a flow chart illustrating an exemplary method for modifying settings of autonomous vehicle sensors based on predicted environmental states that includes determining 702 (e.g., by an automation computing system 116), based on sensor data 704 (e.g., from one or more sensors 212), that a predicted environmental state of the autonomous vehicle 100 is associated with a sensory input outside an operating range of a sensor 212; determining 706 (e.g., by the automation computing system 116) a modified operating range of the sensor 212; and modifying 708 (e.g., by the automation computing system 116) one or more sensors 212 to operate according to the modified operating range.

The method of FIG. 8 differs from FIG. 7 in that determining 702, based on sensor data 704, that a predicted environmental state of the autonomous vehicle 100 is associated with a sensory input outside an operating range of a sensor 212 includes identifying 802, based on camera sensor data 704, a lighting boundary. The lighting boundary includes a transition between a shadowed and unshadowed area. Accordingly, identifying 802 the lighting boundary includes applying object detection, shadow detection, or other techniques to the camera sensor data 704 (e.g., to image data, to one or more frames of video data).

Determining 702, based on sensor data 704, that a predicted environmental state of the autonomous vehicle 100 is associated with a sensory input outside an operating range of a sensor 212 also includes determining 804 that the sensor 212 will pass through the lighting boundary. Determining 804 that the sensor 212 will pass through the lighting boundary may include determining that a portion of the autonomous vehicle 100 housing the sensor 212 passes through the lighting boundary. Determining 804 that the sensor 212 will pass through the lighting boundary may be based on one or more algorithms and/or one or more machine learning models (e.g. predictive models) to predict a location of the sensor 212 and/or autonomous vehicle 100. The one or more machine learning models may accept, as input, sensor data 704, current or projected speeds, trajectories, etc. of the autonomous vehicle 100 and provide, as output, a predicted environmental state for the autonomous vehicle and/or an indication of whether the sensor 212 and/or autonomous vehicle passes through the lighting boundary.

Figure 9:
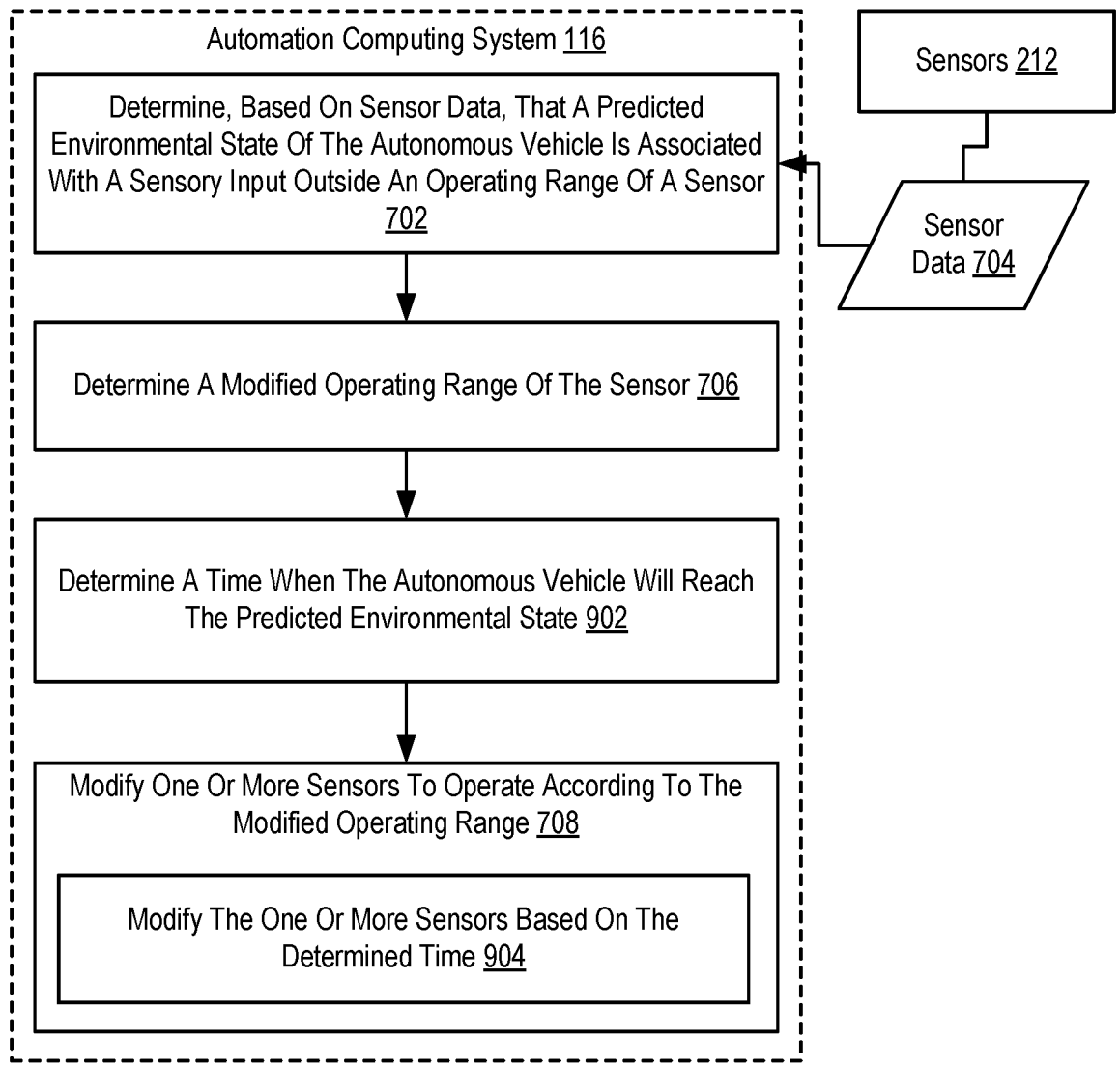
FIG. 9 is a flowchart of an example method for modifying settings of autonomous vehicle sensors based on predicted environmental states.

For further explanation, FIG. 9 sets forth a flow chart illustrating an exemplary method for modifying settings of autonomous vehicle sensors based on predicted environmental states that includes determining 702 (e.g., by an automation computing system 116), based on sensor data 704 (e.g., from one or more sensors 212), that a predicted environmental state of the autonomous vehicle 100 is associated with a sensory input outside an operating range of a sensor 212; determining 706 (e.g., by the automation computing system 116) a modified operating range of the sensor 212; and modifying 708 (e.g., by the automation computing system 116) one or more sensors 212 to operate according to the modified operating range.

The method of FIG. 9 differs from FIG. 7 in that the method of FIG. 9 includes determining 902 (e.g., by the automation computing system 116) a time when the autonomous vehicle 100 will reach the predicted environmental state. Determining 902 a time when the autonomous vehicle 100 will reach the predicted environmental state may include determining a time when the autonomous vehicle 100 or a portion of the autonomous vehicle 100 (e.g., the sensor 212) will reach or cross a boundary or object identified in the sensor data 704. For example, assuming that the sensor data 704 includes a lighting boundary, determining 902 the time when the autonomous vehicle 100 will reach the predicted environmental state includes determining a time when the autonomous vehicle 100 and/or the sensor 212 crosses the lighting boundary. Determining the time when the autonomous vehicle 100 and/or sensor 212 crosses or reaches the object or boundary may be based on an estimated distance to the object or boundary and an actual or predicted speed of the autonomous vehicle 100.

The method of FIG. 9 further differs from FIG. 7 in that modifying 708 one or more sensors 212 to operate according to the modified operating range includes modifying 904 the one or more sensors 212 based on the determined time. For example, the one or more sensors 904 may be modified at the determined time or at a predefined offset relative to the determined time such that the one or more sensors 904 are modified by the time the autonomous vehicle 100 reaches the predicted environmental state. As another example, the one or more sensors 904 may be modified at some time before the determined time and a switched fabric may be modified at the determined time, or at a predefined offset relative to the determined time, such that the modified one or more sensors 904 provide sensor data to the automation computing system 116 when the autonomous vehicle 100 reaches the predicted environmental state.

Figure 10:
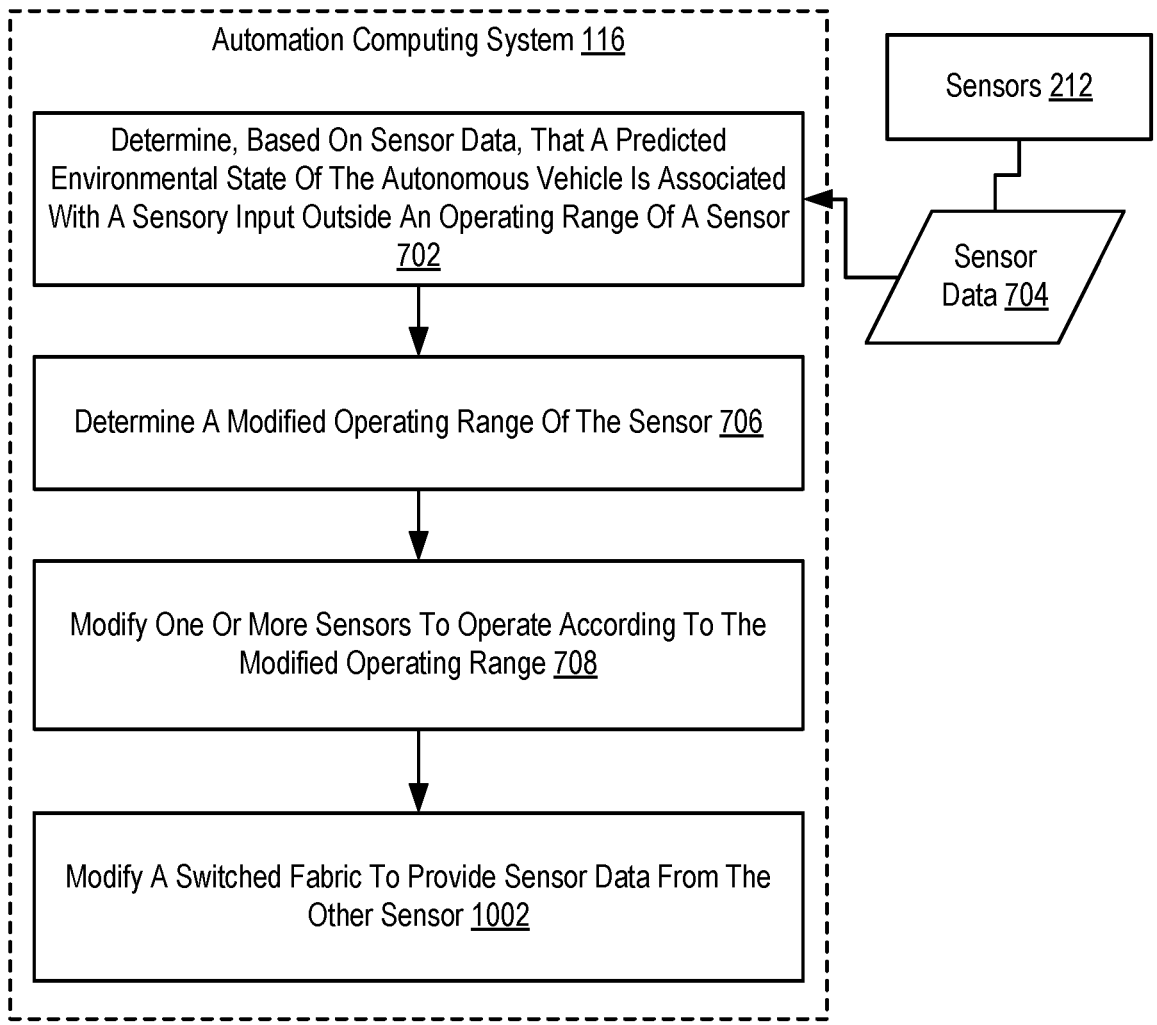
FIG. 10 is a flowchart of an example method for modifying settings of autonomous vehicle sensors based on predicted environmental states.

For further explanation, FIG. 10 sets forth a flow chart illustrating an exemplary method for modifying settings of autonomous vehicle sensors based on predicted environmental states that includes determining 702 (e.g., by an automation computing system 116), based on sensor data 704 (e.g., from one or more sensors 212), that a predicted environmental state of the autonomous vehicle 100 is associated with a sensory input outside an operating range of a sensor 212; determining 706 (e.g., by the automation computing system 116) a modified operating range of the sensor 212; and modifying 708 (e.g., by the automation computing system 116) one or more sensors 212 to operate according to the modified operating range.

Assume that it was determined that the predicted environmental state of the autonomous vehicle 100 is associated with a sensory input outside of the operating range of a first sensor 212. Further assume that the automation computing system 116 is processing sensor data 704 from this first sensor 212 to generate driving decisions. Further assume that the modified 708 one or more sensors includes another sensor 212 (e.g., a second sensor 212, a redundant sensor 212) in the same sensing space as the first sensor 212. Accordingly, the method of FIG. 10 differs from FIG. 7 in that the method of FIG. 10 also includes modifying 1002 a switched fabric to provide sensor data 704 (e.g., to the automation computing system 212) from the other sensor 212 (e.g., the modified other sensor 212). Thus, by modifying 1002 the switched fabric, the automation computing system 116 receives sensor data 704 from the other sensor 212 whose operating range is modified to operate within the predicted environmental state.

In view of the explanations set forth above, readers will recognize that the benefits of modifying settings of autonomous vehicle sensors based on predicted environmental states according to embodiments of the present invention include:

Improved performance of the autonomous vehicle though dynamic adjustment of the operating ranges of sensors to reflect predicted environmental states. Thus, the amount of unusable or faulty sensor data from sensors receiving sensory input outside their operational ranges is minimized or eliminated.

Exemplary embodiments of the present invention are described largely in the context of a fully functional computer system for modifying settings of autonomous vehicle sensors based on predicted environmental states. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for modifying settings of autonomous vehicle sensors based on predicted environmental states, comprising:
    determining, based on video data, that an illumination of a predicted input to a camera of the autonomous vehicle falls outside an operating range of the camera, wherein the operating range of the camera comprises a range of illumination based on a current exposure setting of the camera;
    determining a modified operating range of the camera; and
    modifying the exposure setting of one or more cameras based on the modified operating range.

2. The method of claim 1, wherein determining that the illumination of the predicted input to the camera of the autonomous vehicle falls outside the operating range of the camera comprises:
    identifying, based on the video data, a lighting boundary; and
    determining that the camera will pass through the lighting boundary.

3. The method of claim 1, further comprising:
    determining a time when the autonomous vehicle will reach a predicted environmental state; and
    wherein modifying the one or more cameras comprises modifying the one or more cameras based on the determined time.

4. The method of claim 1, wherein the one or more cameras comprises the camera.

5. The method of claim 1, wherein the one or more cameras comprises another camera distinct from the camera, and the method further comprises modifying, after modifying the operating range, a switched fabric to provide video data from the other camera.

6. The method of claim 1, further comprising calculating the modified exposure setting based on the modified operating range.

7. The method of claim 1, further comprising selecting the modified exposure setting from a selection of exposure settings.

8. An apparatus for modifying settings of autonomous vehicle sensors based on predicted environmental states, the apparatus configured to perform steps comprising:
    determining, based on video data, that an illumination of a predicted input to a camera of the autonomous vehicle falls outside an operating range of the camera, wherein the operating range of the camera comprises a range of illumination based on a current exposure setting of the camera;
    determining a modified operating range of the camera; and
    modifying the exposure setting of one or more cameras based on the modified operating range.

9. The apparatus of claim 8, wherein determining that the illumination of the predicted input to the camera of the autonomous vehicle falls outside the operating range of the camera comprises:
- identifying, based on the video data, a lighting boundary; and
- determining that the camera will pass through the lighting boundary.

10. The apparatus of claim 8, wherein the steps further comprise:
- determining a time when the autonomous vehicle will reach a predicted environmental state; and
- wherein modifying the one or more cameras comprises modifying the one or more cameras based on the determined time.

11. The apparatus of claim 8, wherein the one or more cameras comprises the camera.

12. The apparatus of claim 8, wherein the one or more cameras comprises another camera distinct from the camera, and the method further comprises modifying, after modifying the operating range, a switched fabric to provide video data from the other camera.

13. The apparatus of claim 8, further comprising calculating the modified exposure setting based on the modified operating range.

14. The apparatus of claim 8, further comprising selecting the modified exposure setting from a selection of exposure settings.

15. An autonomous vehicle for modifying settings of autonomous vehicle sensors based on predicted environmental states, comprising:
- an apparatus configured to perform steps comprising:
  - determining, based on video data, that an illumination of a predicted input to a camera of the autonomous vehicle falls outside an operating range of the camera, wherein the operating range of the camera comprises a range of illumination based on a current exposure setting of the camera;
  - determining a modified operating range of the camera; and
  - modifying the exposure setting of one or more cameras based on the modified operating range.

16. The autonomous vehicle of claim 15, wherein determining that the illumination of the predicted input to the camera of the autonomous vehicle falls outside the operating range of the camera comprises:
- identifying, based on the video data, a lighting boundary; and
- determining that the camera will pass through the lighting boundary.

17. The autonomous vehicle of claim 15, wherein the steps further comprise:
- determining a time when the autonomous vehicle will reach a predicted environmental state; and
- wherein modifying the one or more cameras comprises modifying the one or more cameras based on the determined time.

18. The autonomous vehicle of claim 15, wherein the one or more cameras comprises the camera.

19. The autonomous vehicle of claim 15, wherein the one or more cameras comprises another camera distinct from the camera, and the method further comprises modifying, after modifying the operating range, a switched fabric to provide video data from the other camera.

20. A computer program product disposed upon a non-transitory computer readable medium, the computer program product comprising computer program instructions for modifying settings of autonomous vehicle sensors based on predicted environmental states that, when executed, cause a computer system of the autonomous vehicle to carry out the steps of:
- determining, based on video data, that an illumination of a predicted input to a camera of the autonomous vehicle falls outside an operating range of the camera, wherein the operating range of the camera comprises a range of illumination based on a current exposure setting of the camera;
- determining a modified operating range of the camera; and
- modifying the exposure setting of one or more cameras based on the modified operating range.

* * * * *